United States Patent Office
3,072,585
Patented Jan. 8, 1963

3,072,585
VINYLBENZYLOXY PHENYLBENZOTRIAZOLES
Jerry P. Milionis and William B. Hardy, South Bound Brook, N.J., assignors to American Cyanamid Company, New York, N.Y., a corporation of Maine
No Drawing. Filed Jan. 13, 1960, Ser. No. 2,132
10 Claims. (Cl. 260—22)

This invention relates to new monomers for the preparation of polymeric materials which also have the property of selectively absorbing ultraviolet light and to the copolymers thereof. More specifically, this invention relates to compounds of the formula

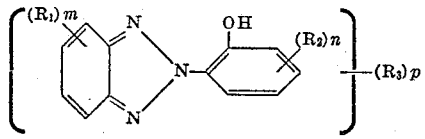

in which $R_1$ and $R_2$ may be lower alkyl, alkoxy, halogen, carboxy, sulfonamide, sulfonic acid or nitro, in which $R_3$ represents the grouping

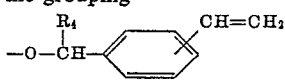

wherein $R_4$ is hydrogen or alkyl, and in which $m$ and $n$ are each zero, 1 or 2 and $p$ represents a positive integer less than 4, $R_3$ being a substituent on a carbocyclic aromatic ring of the 2-phenylbenzotriazole moiety. More specifically, also, this invention relates to polymeric materials comprising copolymerization products of compounds having a polymerizable $CH_2=C<$ group and compounds of the above description and also to polymerizable compositions of an unsaturated polyester, a polymerizable monomer containing a polymerizable $CH_2=C<$ group, and a different monomer selected from the above defined class of benzotriazoles or compositions of a styrene and a compound of the above defined class.

The field of resin additives has seen, in the past few years, the development of a new type of additive, namely the ultraviolet absorber. These are compounds which selectively absorb incident ultraviolet light and re-emit the energy in the form of heat or sometimes visible light. They consequently, protect the resin material from photo decomposition.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbancy in the desired wave length range. However, for the most desirable ultraviolet protection, the high absorbancy index should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

More recently there have been suggested ultraviolet absorbers which contain copolymerizable groups. The original classes of ultraviolet absorbers were usually hydroxyalkoxy derivatives of benzophenone and, more recently, benzotriazoles. The first suggestions of copolymerizable groups have been to replace the alkoxy group with an alkenyl group on the ring of a benzophenone. These compounds have been found to copolymerize and to give protection to plastics in which they form, in small amounts, one of the comonomers. However, the copolymerization efficiency of such compounds has proved to be wholly inadequate. Very seldom does more than 15% of the alkenyloxy benzophenones actually become part of the polymeric chain. The remainder of the material added is easily leached out by solvent extraction. Since these compounds are expensive such an inefficient copolymerization results in very expensive protection and it is often cheaper to use the conventional ultraviolet absorber which is a mere additive and not a comonomer.

We have found that 2-hydroxyphenylbenzotriazoles which carry on either the phenyl ring or the benz ring, or both, of the benzotriazole moiety a vinylbenzyloxy substituent is an efficient comonomer and as such provides extraordinary protection from incident ultraviolet light to polymeric materials in which it is copolymerized, especially polystyrenes. The 2-hydroxyphenylbenzotriazoles which form our invention are described above and will be described below in more detail. We have also found that the copolymers of polymerizable ethylene compounds containing a $CH_2=C<$ polymerizable group with compounds of the above description are polymers of extraordinary stability to ultraviolet light.

The new comonomers of our invention are prepared by the reaction of hydroxy substituted 2-hydroxyphenylbenzotriazoles with chloromethylstyrenes. A representative example of such a preparation is the reaction of 2(2,4-dihydroxyphenyl)benzotriazole with chloromethylstyrene as shown by the following equation:

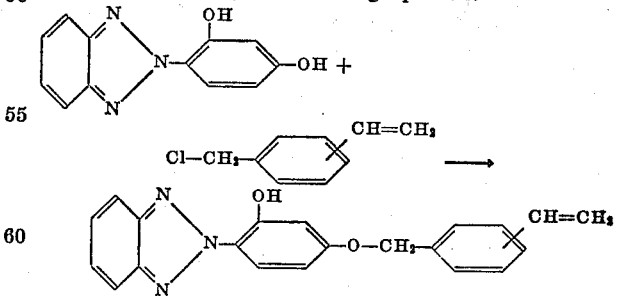

The chlormethylstyrenes which are used as one of the starting materials in the preparation of the monomers of our invention can be prepared by a number of different methods. One such is described in the copending application of Hoffenberg, Serial No. 803,674, filed April 2, 1959 now Patent No. 2,981,758. In this method a methylstyrene is directly chlorinated. Other methods which have been used in the past include the method described in U.S. Patent 2,780,604 wherein ethyltoluene is first chlorinated to product 1-chloromethylphenyl ethane and the product is then dehydrochlorinated to produce chlormethylstyrene. Another method has been the direct chloromethylation of styrene. In many of these methods the exact position of the vinyl group with relation to the chloromethyl group is not known or is not fixed, mixtures being obtained. The exact relation of the vinyl group to the chlormethyl group and consequently to the methylene of the benzyloxy group in the final monomers of my invention is of no importance and consequently in the above equation the vinyl group is not fixed in any one position, in most cases the position not being known.

Not only the chloromethylstyrenes, but also other α-chloroalkylstyrenes, such as α-chloroethyl styrene and the like, can also be used. Consequently the polymerizable group in the new comonomers of our invention is defined as an α-(vinylphenyl)alkoxy group, which can be represented by the formula:

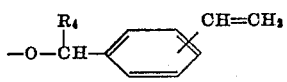

wherein $R_4$ can be hydrogen or alkyl. When it is hydrogen the group is the vinylbenzyloxy group. When it is —$CH_3$, the group becomes the α-(vinylphenyl)ethoxy group.

The benzotriazole intermediates used in our invention are further hydroxylated 2-hydroxyarylbenzotriazoles in which the other hydroxyl groups can be on the 2-aryl radical or on the benzo ring. Either ring may be further substituted by chloro, bromo, sulfonamido, carboxy, alkoxy or alkyl.

These compounds are prepared by one of several ways. In one synthesis an o-aminophenol is diazotized and coupled into a metaphenylene diamine. The coupling takes place ortho to one amino group and the resulting o-aminoazo body is then triazolized by oxidation in the usual manner. The amino group is then replaced by a hydroxyl by the standard method, using diazotization. This synthesis can be illustrated by the following preparation of the simplest member of the series:

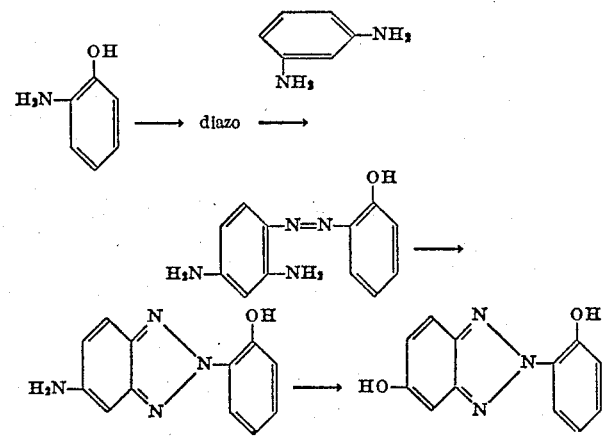

The o-aminophenols which can be used in this synthesis include o-aminophenol and any of its chloro, bromo, sulfonamide, alkoxy, hydroxy or alkyl derivatives such as 2-amino-4-chlorophenol
2-amino-4-bromophenol
2-amino-3,5-dibromophenol
2-amino-4,6-dichlorophenol
2-amino-4,6-dibromophenol
2-amino-4-nitrophenol
2-amino-5-nitrophenol
2-amino-6-nitrophenol
2-amino-6-chloro-4-nitrophenol
2-amino-4-chloro-5-nitrophenol
2-amino-6-bromo-4-nitrophenol
2-amino-4-bromo-6-nitrophenol
2-amino-4,6-dinitrophenol
2-amino-6-methylphenol
2-amino-4-methylphenol
2-amino-6-methyl-4-bromophenol
2-amino-4-nitro-6-methylphenol
2-amino-5,6-dimethylphenol
2-amino-4,6-dimethylphenol
2-amino-5-methoxyphenol
2-amino-5-ethoxyphenol
2-amino-5-methylresorcinol
6-amino-4-methylresorcinol
6-amino-2-methylresorcinol
2-amino-3-hydroxybenzoic acid
3-amino-4-hydrobenzoic acid
3-amino-4-hydroxybenzoic acid
4-amino-3-hydroxybenzoic acid
3-amino-4-hydroxybenzene sulfonic acid
3-amino-4-hydroxy-6-chlorobenzene sulfonic acid
3-amino-4-hydroxy-5-methylbenzene sulfonic acid
4-amino-5-hydroxy-2-methylbenzene sulfonic acid
3-amino-2-hydroxy-5-methylbenzene sulfonic acid
3-amino-2-hydroxy-5-chlorobenzene sulfonic acid
3-amino-2-hydroxy-5-nitrobenzene sulfonic acid
4-amino-3-hydroxybenzene sulfonic acid
3-amino-4-hydroxybenzene sulfonamide
4-aminoresorcinol Those o-aminophenols with further hydroxy substituents such as 4-aminoresorcinol will of course give a polyhydroxybenzotriazole with extra hydroxyls on both the benz and the 2-phenyl rings. The diamines usuable in this synthesis include any diamine which couples ortho to the amino group. A position ortho to one amino must be unsubstituted and must bear such relation to the other substituents that coupling will take place there. Diamines which are usable include 1,3-diamino-2-chlorobenzene
1,3-diamino-4-chlorobenzene
1,3-diamino-5-chlorobenzene
1,3-diamino-2,5-dichlorobenzene
1,3-diamino-4-bromobenzene
2,4-diaminotoluene
2,6-diaminotoluene
2,4-diaminometaxylene
3,5-diaminoanisole
2,4-diaminoanisole
2,4-diaminophenatole The products from such couplings are triazolized and the extra amino group is then diazotized and replaced with hydroxyl by warming the diazo solution in the presence of sulfuric acid.

An alternative synthesis is preferably used. An o-nitroaniline is diazotized and coupled with a phenol under conditions in which coupling takes place ortho to the phenol group. This ordinarily means a polyhydroxybenzene although it can also be a phenol having a meta or para substituent. The ortho nitro group is then reduced. Triazolization occurs by the reduction. An example of such a synthesis is the following:

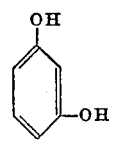

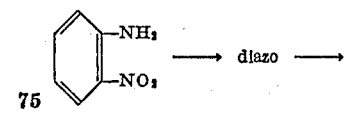

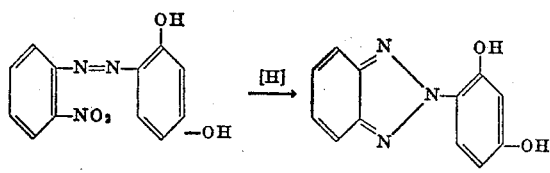

The nitroanilines which may be used include ortho-nitroaniline 6-methoxy-2-nitroaniline
6-ethoxy-2-nitroaniline
5-hydroxy-2-nitroaniline
5-methoxy-2-nitroaniline
4-hydroxy-2-nitroaniline
4-methoxy-2-nitroaniline
4-ethoxy-2-nitroaniline
3-nitroanthranilic acid
2-nitro-3-aminobenzoic acid
3-nitro-4-aminobenzoic acid
4-nitro-3-aminobenzoic acid
3-nitrosulfanilic acid
3-nitrosulfanilamide
2-nitro-4-chloroaniline
2-nitro-5-chloroaniline
2-nitro-3,6-dichloroaniline
2-nitro-4,5-dichloroaniline
2-nitro-4,6-dichloroaniline
2-nitro-5,6-dichloroaniline
2-nitro-3,4,6-trichloroaniline
2-nitro-4-bromoaniline
2-nitro-5-bromoaniline
2-nitro-6-bromoaniline
2-nitro-4-bromo-5-chloroaniline
2-nitro-4-bromo-6-chloroaniline
2-nitro-4-chloro-6-bromoaniline
2-nitro-4-iodoaniline
2-nitro-5-iodoaniline
2-nitro-4,6-diiodoaniline
2,4-dinitroaniline
2-nitro-meta-toluidine
4-nitro-meta-toluidine
3-nitro-para-toluidine The phenols which can be used as coupling components include phenols and their alkyl, alkoxy, chloro, or bromo derivatives which couple ortho to the hydroxyl, such as:

Phenol
4-chlorophenol
4-bromophenol
p-Cresol
4-tert-butyl-ortho-cresol
2-tert-butyl-para-cresol
Para-tert-butylphenol
4-chloro-meta-cresol
2-chloro-para-cresol
5-chloro-2-hydroxybenzenesulfonic acid
4-chlororesorcinol
5-chlorosalicycloylaldehyde
Para-methoxyphenol
Para-ethoxyphenol
Para-butoxyphenol
Para-benzyloxyphenol
Para-lauroxyphenol
2,4-dimethylphenol
Hydroquinone
Resorcinol
Hydroxyhydroquinone
Phloroglucinol
1,2,3,5-tetrahydroxybenzene
β-Resorcylic acid
3-hydroxy-4-methoxy phenol
4-ethylresorcinol
4-propylresorcinol
4-butylresorcinol
4-hexylresorcinol
4-octylresorcinol In order that a 2-hydroxyphenylbenzotriazole be obtained in which there is a further etherifiable hydroxyl, either one must use or of the above listed phenols with a hydroxy-o-nitraniline or one must use one of the above polyhydroxy phenolic compounds.

The new compounds of our invention can be incorporated in resins and plastics like any other UV absorber to give good protection. However, an especially important feature of our invention lies in the ability to copolymerize well with the monomers for the various plastics and thus become an integral part of the resin molecule. Such copolymerization can be carried out with any monomer containing ethylenic double bonds, such as ethylene, propylene, butylene, styrene, methyl styrene, ethyl styrene, propyl styrene, etc., acrylic acid and its amide, methacrylic acid, acrylonitrile, vinyl esters such as vinylacetate and chloride, vinyl ethers such as vinyl butyral, and such compounds.

They can also be included with unsaturated modifiers of polyester resins such as are described in U.S. 2,255,313, U.S. 2,443,735, U.S. 2,443,736, U.S. 2,443,737, U.S. 2,443,738, U.S. 2,443,739, U.S. 2,443,740 and U.S. 2,443,741, all of which are expressly incorporated by reference. Such resins are prepared from unsaturated polyester resins prepared from alpha, beta unsaturated poly carboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use such acids as oxalic, malonic, succinic, glutaric, sebacic, and chlorinated polycarboxylic acids such as tetrachlorophthalic anhydride, hexachloroendomethylene tetrahydrophthalic acid, and the like, but preferably in amounts less than a larger proportion of the total amount of polycarboxylic acid present.

Whenever available, the anhydrides of these acids may be used, or mixtures of the acids or mixtures of the anhydrides thereof.

As polyhydric alcohols which may be used to prepare the unsaturated polyesters, it is preferred to make use of those alcohols having only two hydroxy groups although minor amounts of alcohols having three hydroxy groups, four hydroxy groups, or more hydroxy groups, may be used in minor amounts. As dihydroxy alcohols, one could use ethylene glycol, diethylene glycol, propylene glycol, dipropylene glycol, butanediol 1-4, butanediol 1-3, butanediol 1-2, pentanediol 1-2, pentanediol 1-3, pentanediol 1-4, pentanediol 1-5, hexanediol 1-6, and the like. Addtionally, one could use glycerol, pentaerythritol, dipentaerythritol, and the like. The esterification of the alcohol is carried out until the acid number of the mixture has been reduced below 55.

The modifier for polyester resins is usually a polymerizable material having a $CH_2=C<$ group. Amongst these polymerizable compounds are styrene, side chain substituted styrenes such as the alpha methylstyrene, alpha ethylstyrene, and the like, or ring substituted styrene such as ortho, meta and para-alkyl styrenes such as o-methyl styrene, p-ethylstyrene, meta-propylstyrene, 2,4-dimethylstyrene, 2,5-diethylstyrene and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endo-methylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The modifier is used in a ratio of from 10 to 90 parts of polyester up to 60 parts to 40 parts of polyester, preferably 25 to 30 parts of modifier is used to 65 to 75 parts of polyester.

While the compounds of our invention can be used in comonomers with all of these various ethylenic type monomers, they are especially preferred as comonomers with styrene and various derivatives to form the various polystyrenes. Such styrenes include styrene, methyl-styrene, ethylstyrene, dimethylstyrene, propylstyrene, butylstyrene, chlorostyrenes, cyanostyrenes, tertiarybutylstyrenes, vinylbiphenyls, hydroxystyrenes, vinylbenzoic acid, and vinyldiphenylethers.

The new monomers of our invention can also be included with advantage in styrenated oil-modified alkyd resins, in place of or in addition to the styrene. Such resins, which are extensively used in coatings, are very well described in U.S. 2,713,039, U.S. 2,748,092 and U.S. 2,851,431, which are expressly herein incorporated by reference for the purpose of such disclosure. These resins are essentially the reaction products of drying oils and phthalic anhydride with polyhydric alcohol, modified by reaction with styrene. The styrenation can take place before or after the esterification of the acids by the alcohols or at intermediate stages. The new monomers of our invention are reacted at the same stages, just like the styrene, as desired.

The usage of the vinylbenzyloxyphenylbenzotriazoles of our invention in the copolymers of our invention is usually small. A minimum of 0.01% by weight should be in the copolymer. Amounts of 0.5 to 2.0% are preferred. For special uses much larger amounts, sometimes as much as 20% can be used.

It is an advantage of the new monomers of our invention that they are copolymerized much more effectively with other ethylenic monomers and polymers than polymerizable ultraviolet absorbers heretofore known. It is an advantage of the polymers of our invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

Our invention can be illustrated by the following examples in which parts are by weight unless otherwise specified.

*Example 1*

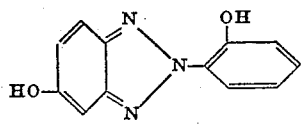

o-Aminophenol (27.3 parts) is diazotized with sodium nitrite (18 parts) and hydrochloric acid (38 parts of real) in 250 parts by volume of water. The solution of the diazonium salt is added to meta-phenylene diamine (27 parts) and hydrochloric acid (9.1 parts of real) in 500 parts by volume of water at 0–5° C. Concentrated sodium acetate is then added dropwise at 5° C. until the solution does not change Congo red paper. The mixture is stirred while warming to room temperature. The solution is filtered off, washed with 10% sodium bicarbonate solution and water.

Oxidative triazolation of the resulting azo dye is carried out in a solution of copper sulfate pentahydrate (310 parts) in water (750 parts by volume) methanol (750 parts by volume) and ammonium hydroxide (1,250 parts by volume). The product isolated from this step is treated with boiling zinc and glacial acetic acid to destroy unreacted azo. The zinc is removed and the filtrate is drowned in water. The solid product is collected by filtration and recrystallized twice from alcohol. The resulting 5-amino-2-(2-hydroxyphenyl)benzotriazole (22.6 parts) is diazotized with 7.1 parts of sodium nitrite and 50 parts of sulfuric acid in 400 parts of water. The reaction mixture heats at 100° C. for one hour to convert the diazonium compound to 5-hydroxy-2-(2-hydroxyphenyl)-benzotriazole.

When the ortho-aminophenol in the above procedure is replaced with an equivalent quantity of each of the following materials respectively the similarly substituted product having the indicated substituent in the 2-phenyl ring is obtained.

2-amino-4-chlorophenol
2-amino-4-bromophenol
2-amino-4,6-dichlorophenol
2-amino-4-nitrophenol
2-amino-5-ethoxyphenol
2-amino-5-methylphenol
2-amino-3-hydroxybenzoic acid
3-amino-4-hydroxybenzenesulfonamide
3-amino-2-hydroxy-5-methylbenzenesulfonic acid

*Example 2*

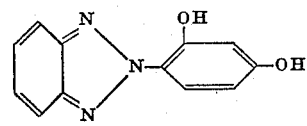

o-Nitroaniline (55.2 parts) is diazotized in the usual manner with concentrated hydrochloride acid (320 parts by volume) and sodium nitrite (27.6 parts). The excess nitrite is removed with sulfamic acid (6.0 parts). The clear diazonium solution is added dropwise to a cooled solution (−5 to +5° C.) for resorcinol (65.6 parts) in 2,000 parts by volume of water containing hydrochloric acid (120 parts by volume of 5 normal). The crude product is collected.

The intermediate azo compound is slurried in water and triazotized by the addition of zinc dust (78.5 parts) and sodium hydroxide (480 parts by volume of 5 normal). The crude product thus obtained is recrystallized three times from aqueous ethanol.

When the ortho-nitroaniline in the above procedure is replaced with an equivalent quantity of the following compounds the correspondingly substituted 2-hydroxyphenylbenzotriazole is obtained.

6-methoxy-2-nitroaniline
3-nitroanthranilic acid
3-nitrosulfanilamide
5-chloro-2-nitroaniline
4,6-dichloro-2-nitroaniline
5-bromo-2-nitroaniline
4-iodo-2-nitroaniline
2-nitrometatoluidine Similarly, when hydroquinone or 2-hydroxyhydroquinone is substituted in equivalent amounts for the resorcinol, the correspondingly substituted product is obtained.

*Example 3*

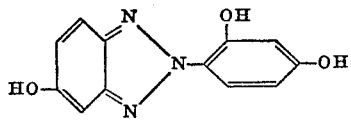

The procedure of Example 2 is followed using an equivalent quantity of 4-hydroxy-2-nitroaniline in place of the 2-nitroaniline.

When the resorcinol in the above procedure is replaced by one of the following, the correspondingly substituted hydroxylated phenylbenzotriazole is obtained.

Para-chlorophenol
p-Bromophenol
p-Cresol
2-hydroxyhydroquinone
p-Methoxyphenol
Hydroquinone

*Example 4*

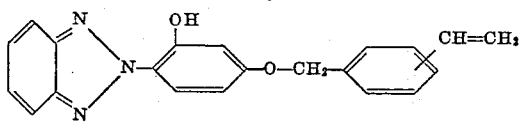

22.7 parts of the product of Example 2, 15.3 parts of chloromethylstyrene and 18 parts of potassium carbonate in 100 parts of acetone are refluxed until the reaction is substantially complete. The mixture is cooled and diluted with 800 parts of water. The insoluble product is recrystallized from ethanol.

When the product of Example 2 is replaced in the above procedure with any of the further substituted products described in Example 2, the correspondingly substituted vinyl benzyloxy phenylbenzotriazole is obtained.

*Example 5*

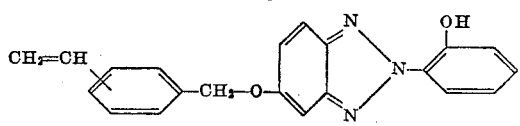

The procedure of Example 4 is followed replacing the product of Example 2 with the product of Example 1. Similarly, when the other compounds described in Example 1 are substituted for the product of Example 1 the correspondingly substituted vinylbenzyloxy phenylbenzotriazole is obtained.

*Example 6*

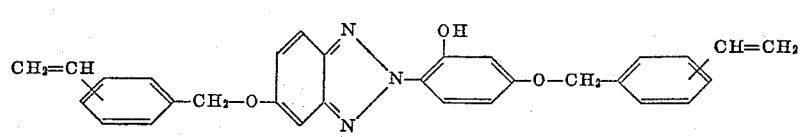

The procedure of Example 4 is followed using half the equivalent quantity of the product of Example 3 in place of the product of Example 2.

*Example 7*

A mixture of 9 parts of styrene and about 1 part of the compound of Example 4 is heated in the presence of 0.1 part of benzoyl peroxide as a catalyst at 80° C. for about 8 hours and 100° C. for about 72 hours in a closed container.

The resulting copolymer is added to benzene and after complete solution, is precipitated by the addition of an excess of ethanol. After removal it is further extracted with ethanol to remove unreacted benzotriazole compound from the formed copolymer.

Similarly when any of the compounds prepared in Example 5 or any of the other compounds prepared in Example 4 are used in place of the main product described in Example 4, a similar copolymer is obtained.

*Example 8*

0.5 gram of the product of Example 4 and 0.05 gram of benzoyl peroxide are placed in a Pyrex tube. 4.5 grams of styrene is added. The tube is flushed with nitrogen then sealed. The mixture is heated at 120° C. for 100 hours. The copolymer is dissolved in toluene and precipitated in an excess of alcohol. It is then given several washings with hot alcohol. A spectrophotometric analysis shows that a major part of the product of Example 4 has copolymerized.

A small amount of the copolymer is dissolved in hot toluene. This solution is brush on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the UV absorbing copolymer shows only a slight discoloration.

When the product of Example 5 is used in place of the product of Example 4, a similar copolymer is obtained.

*Example 9*

The copolymer of Example 7 is milled into polystyrene in such proportions (5.0 parts to 95 parts of the polystyrene) as to give a blend containing almost 0.5% of the benzophenone in the mixture of polymers. Molded pieces of the blend show improved resistance to exposure in the Fade-Ometer compared to polystyrene.

*Example 10*

The procedure of Example 7 is followed using 9.95 parts of styrene and 0.5 part of the compound of Example 1. The resulting copolymer shows enhanced resistance to ultraviolet light, compared to pure polystyrene.

*Example 11*

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene and 10 parts of the monomer from Example 4. At the same time there is added 2.4 parts of $(NH_4)_2S_2O_8$ in 15 parts of water, in several portions. After the reaction is complete, excess acrylonitrile and styrene are removed by steam distillation, the polymer is coagulated, washed and dried. This polymer is used in conjunction with alkyd resins to form surface coatings.

2.5 parts of the above tripolymer is milled into 97.5 parts of styrene acrylonitrile (84:36) copolymer and molded into 50 mil chips. These, along with unmodified styrene-acrylonitrile (84:36) chips are exposed in the weatherometer. The control becomes discolored while the material containing the ultraviolet absorbing comonomer shows little change.

When the compounds described in Example 5 or the other compounds produced in Example 4 are used in place of the main product of Example 4, similar results are obtained.

*Example 12*

Dehydrated castor oil acids (288 parts) are heated to about 245° F. A mixture of 400 parts of styrene, 48 parts of the product of Example 5 and 12.5 parts of benzoyl peroxide is added slowly with agitation. The temperature is raised during this addition to about 290° F. and held there with stirring until the reaction is substantially complete. Unreacted styrene is removed by vacuum distillation. The styrenated alkyd is then made by adding the required amount of phthalic anhydride and glycerol, raising the temperature gradually to 450° F. and holding at this temperature until the reaction is substantially complete. Inert gas is passed through the batch during processing.

When the product of Example 4 is used in place of the product of Example 5, a similar product is obtained.

Example 13

A solution of an unsaturated alkyd resin (30 parts) (prepared from dehydrated castor oil, glycerol and phthalic anhydride), styrene (15 parts), the product of Example 4 (5 parts) and benzoyl peroxide (1 part) in 45 parts of xylene and 5 parts of α-terpineol is heated at 145° C. until the reaction is substantially complete. An ultraviolet absorbing film is produced by the addition of a catalyst, e.g. cobalt naphthenate, to the mixture followed by air drying a film of the mixture.

When the product of Example 5 is used in place of that of Example 4 a similar product is obtained.

Example 14

A mixture of 95 parts of a resin comprising a polyester of excess propylene glycol with equal mole quantities of phthalic and maleic anhydrides blended with 50% of its weight of styrene, 4.75 parts of additional styrene, 0.25 part of the product of Example 4 and 0.50 part of benzoyl peroxide is poured into a mold made of glass plates and cured in an oven for 30 minutes at 80° C., 30 minutes at 105° C. and 1 hour at 120° C. The product is an ultraviolet resistant resin composition.

When the product of Example 5 is used in place of the product of Example 4, a similar product is obtained.

Example 15

A mixture of 9.75 parts of styrene and 0.25 part of the compound of Example 6 is heated in the presence of 0.1 part of benzoyl peroxide for 40 hours at 100° C. A polymer with marked resistance to UV light is obtained.

Example 16

A mixture of 75 parts of butadiene, 24.5 parts of styrene, 0.5 part of the product of Example 4, 0.5 part of dodecyl mercaptan, 180 parts of water, 0.3 part of potassium persulfate and 5.0 parts of sodium stearate is stirred vigorously to form an emulsion. The emulsion is autoclaved and maintained at 50° C. for 16 hours. The resulting latex is treated with sodium chloride solution, followed by addition to a dilute sulfuric acid bath. The crumbs that are formed are filtered, washed and dried at 60° C.

We claim:

1. Compounds of the formula

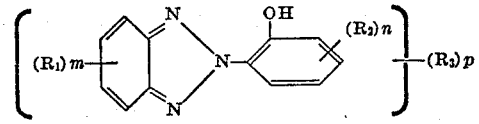

in which $R_1$ and $R_2$ are each selected from the group consisting of lower alkyl, alkoxy, halogen, carboxyl, sulfonamide, sulfonic acid, and nitro, and in which $R_3$ represents the grouping

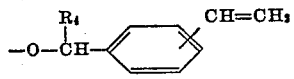

$R_4$ being selected from the group consisting of hydrogen and alkyl, $m$ and $n$ being integers greater than minus 1 and less than 3 and $p$ being a positive integer less than 3, $R_3$ being a substituent on a carbocyclic aromatic ring of the 2-phenyl benzotriazole moiety.

2. The compound

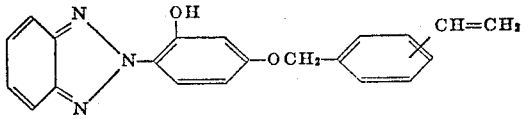

3. The compound

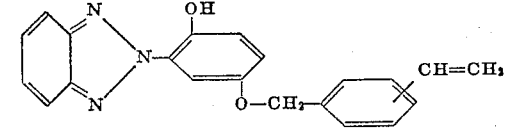

4. The compound

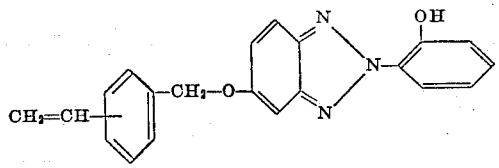

5. The compound

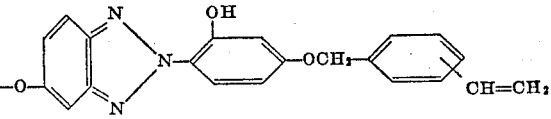

6. Compositions comprising the polymerization product of at least one monomer having a polymerizably reactive vinylidene group with at least 0.01% by weight of a compound having the formula

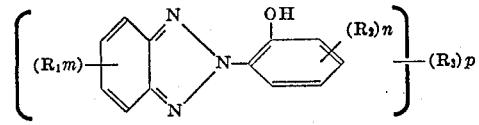

in which $R_1$ and $R_2$ are each selected from the group consisting of lower alkyl, alkoxy, halogen, carboxyl, sulfonamide, sulfonic acid, and nitro, and in which $R_3$ represents the grouping

$R_4$ being selected from the group consisting of hydrogen and alkyl, $m$ and $n$ being integers greater than minus 1 and less than 3 and $p$ being a positive integer less than 3, $R_3$ being a substituent on a carbocyclic aromatic ring of the 2-phenylbenzotriazole moiety.

7. Compositions of claim 6 in which the said polymerization product is the esterification product of a polyhydric alcohol and an ethylenically unsaturated polycarboxylic acid.

8. Compositions of claim 6 in which the polymerization product is a polystyrene.

9. Compositions of claim 6 in which the polymerization product is a copolymer comprising principally butadiene and styrene.

10. Compositions of claim 6 in which the polymerization product is a styrenated oil modified alkyd resin.

References Cited in the file of this patent

UNITED STATES PATENTS

| | | |
|---|---|---|
| 2,842,501 | Freyermuth et al. | July 8, 1958 |
| 2,865,916 | Leavitt et al. | Dec. 23, 1958 |
| 2,962,533 | Hardy et al. | Nov. 29, 1960 |

FOREIGN PATENTS

| | | |
|---|---|---|
| 716,338 | Great Britain | Oct. 6, 1954 |
| 1,195,307 | France | May 19, 1959 |